(12) United States Patent
Garbut et al.

(10) Patent No.: US 10,987,587 B2
(45) Date of Patent: Apr. 27, 2021

(54) SYSTEM AND METHOD FOR GAME OBJECT AND ENVIRONMENT GENERATION

(71) Applicant: TAKE-TWO INTERACTIVE SOFTWARE, INC., New York, NY (US)

(72) Inventors: Aaron Garbut, Edinburgh (GB); Klaas Schilstra, Aberdour (GB); Flavius Alecu, Carlsbad, CA (US); John Whyte, Edinburgh (GB)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 0 days.

(21) Appl. No.: 15/853,080

(22) Filed: Dec. 22, 2017

(65) Prior Publication Data

US 2019/0192972 A1    Jun. 27, 2019

(51) Int. Cl.

| | |
|---|---|
| *A63F 13/60* | (2014.01) |
| *G06T 15/00* | (2011.01) |
| *G06T 13/40* | (2011.01) |
| *G06T 15/04* | (2011.01) |
| *G06T 19/00* | (2011.01) |
| *G06T 15/80* | (2011.01) |

(52) U.S. Cl.
CPC .............. *A63F 13/60* (2014.09); *G06T 13/40* (2013.01); *G06T 15/005* (2013.01); *G06T 15/04* (2013.01); *G06T 15/80* (2013.01); *G06T 19/00* (2013.01); *A63F 2300/6607* (2013.01); *A63F 2300/6615* (2013.01); *G06T 2210/36* (2013.01); *G06T 2210/61* (2013.01)

(58) Field of Classification Search
CPC ............................... A63F 13/60; G06T 15/04
See application file for complete search history.

(56) References Cited

U.S. PATENT DOCUMENTS

| | | | | |
|---|---|---|---|---|
| 2007/0220031 | A1* | 9/2007 | MacMahon | A63F 13/10 |
| 2008/0045283 | A1* | 2/2008 | Stamper | A63F 13/10 |
| | | | | 463/1 |
| 2009/0327723 | A1* | 12/2009 | Yates | G06Q 30/08 |
| | | | | 713/168 |
| 2010/0134485 | A1* | 6/2010 | Bhogal | G06T 15/00 |
| | | | | 345/419 |
| 2011/0039623 | A1* | 2/2011 | Levenson | G06Q 10/00 |
| | | | | 463/42 |
| 2011/0209117 | A1* | 8/2011 | Agustin | G06F 8/38 |
| | | | | 717/109 |
| 2014/0357379 | A1* | 12/2014 | Kruglick | A63F 13/00 |
| | | | | 463/43 |

(Continued)

*Primary Examiner* — Mark K Zimmerman
*Assistant Examiner* — Jonathan M Cofino
(74) *Attorney, Agent, or Firm* — Orrick, Herrington & Sutcliffe LLP

(57) ABSTRACT

A system and method for building and rendering in-game objects. In some embodiments, the system includes a plurality of metadata records describing available assets, wherein each metadata record comprises an asset identifier, which identifies an asset, and a property tag. In some embodiments, the system receives the metadata asset record or the asset identified by the metadata asset record from an asset interface to instruct a rendering engine to load the asset identified by the metadata asset record into a 3D environment.

18 Claims, 8 Drawing Sheets

(56) References Cited

U.S. PATENT DOCUMENTS

2014/0379752 A1* 12/2014 Dawson ................ H04L 67/10
                                                      707/770
2019/0005717 A1*  1/2019 Singh ................... G06T 15/80

* cited by examiner

SYSTEM AND METHOD FOR GAME OBJECT AND ENVIRONMENT GENERATION

FIELD

The present disclosure relates generally to video games, including methods and systems to implement the same, and more specifically, but not exclusively, to systems and methods for efficiently building and rendering in-game objects, including characters.

BACKGROUND

Computer games often comprise a graphically rendered three dimensional (3D) space that represents a virtual world in which the players play the game. This virtual world is typically filled with objects, e.g., characters, rooms, vehicles, items, and environments that are used to create the scene for the game. For example, a game set in a modern-day city would have a virtual world populated with objects like, e.g., buildings, cars, people, etc. Similarly, a game set in medieval Europe might be populated with knights, serfs, castles, horses, etc. As the 3D spaces that these games inhabit have become larger and more complex, the task of filling them with a rich, varied, interesting, and detailed environment has become challenging, both computationally and in terms of the effort required to design and fill the worlds with a large variety of objects.

In game development, this problem of filling virtual worlds with objects typically spans across a number of domains. For example, artists are responsible for creating the in-game objects from people and their clothes to vehicles, buildings and interiors, and all the assorted other miscellaneous things that make up the world. Gameplay designers then must use these objects in the world to create some sort of desired gameplay. In other words, the artists do not create one final and complete static world. Instead, the gameplay designers might rearrange and reconfigure the objects in the world to tell a particular story or to create an environment that will be interesting for a certain sort of game. Graphics rendering specialists must further ensure these 3D objects can be efficiently rendered with as much detail as possible using available or targeted gaming hardware.

In view of the foregoing, a need exists for an improved system for building and rendering in-game objects in an effort to overcome the aforementioned obstacles and deficiencies of conventional video game systems.

Figure 1:
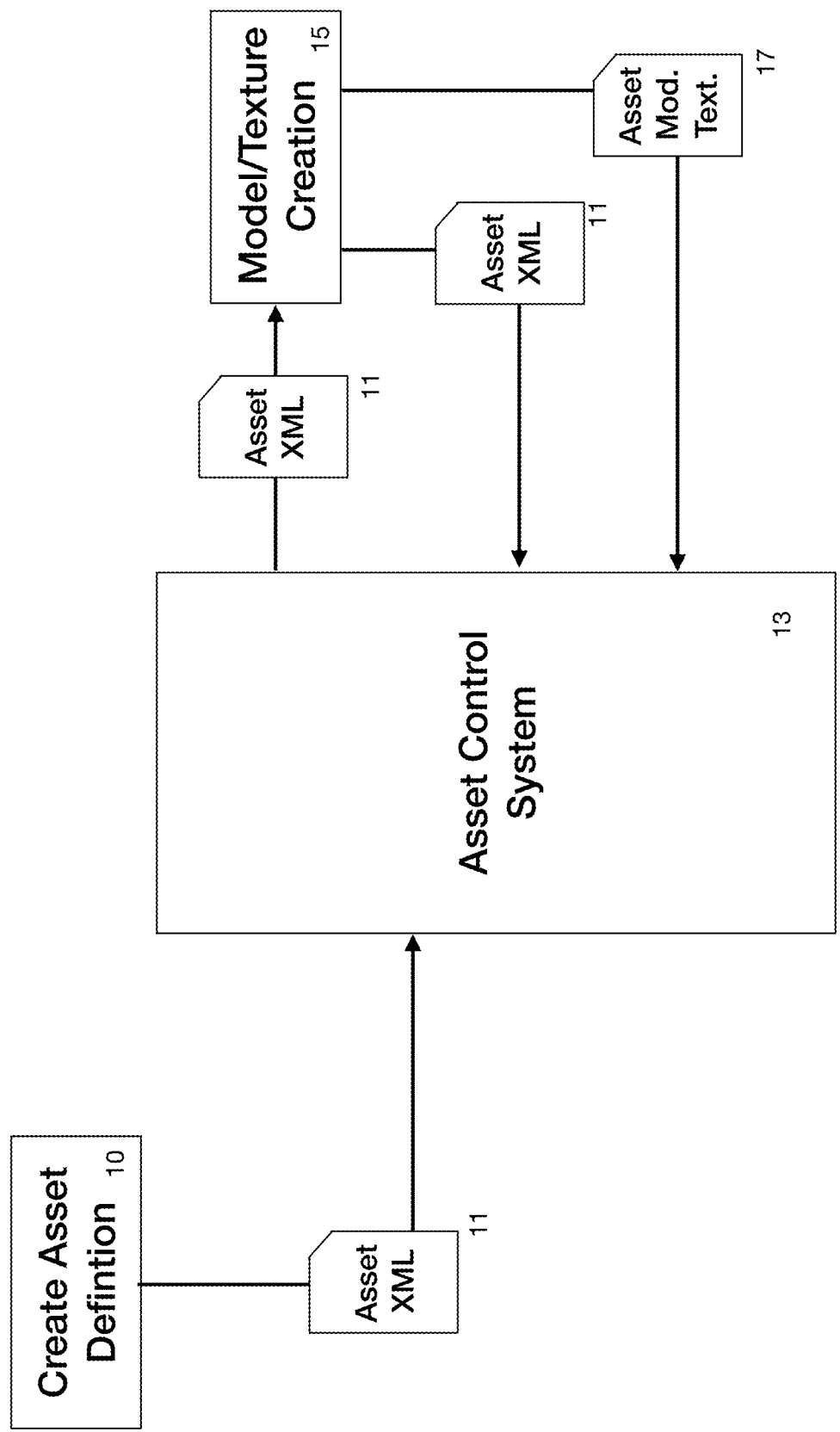
FIG. 1 is an exemplary schematic diagram illustrating one embodiment of the disclosed metadata system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DESCRIPTION OF THE INVENTION

Objects used in 3D graphics, often called assets, are a combination of geometry data (e.g., the 3D model) and data for textures associated with the geometry data. An asset may be formed of one object or it may be a composite object made from a combination of objects. The objects that form a composite object, may in different contexts be used as independent assets unrelated to the composite object or they may always be used as a subset of a larger object.

Persons of skill in the art will recognize that many different sorts of assets, such as vehicles, can be made from collections of sub-components. For example, one aspect of the game might require a room, say a dining room. That entire dining room could be considered one game asset, but it will likely be created from several other assets, such as a table, chairs, dishes, glasses, wallpaper, flooring, etc. The glasses and chairs are independent of the larger dining room asset. As another example, a virtual person in the game, such a background character in a scene, would also be an asset. A person asset might be made up of a number of interchangeable objects, such as legs, a torso, arms, a head, etc. Because the person is made up of interchangeable objects, a variety of different person assets can be made by mixing and matching different constituent parts. But, a body part like a torso might always be used as a sub-part of a larger body object.

Prior art systems generally include libraries of game assets. The systems and methods of the present disclosure add a metadata layer to these game asset systems and provide modified development and game architectures to take advantage of the new metadata layer. This metadata layer includes tags that are added to the object in order to provide useful descriptors. In a preferred embodiment, these descriptors are completely free form and without context. This allows developers to specify information about objects as needed without having to be locked into a ridge preconfigured schema.

For example, one set of developers may create component objects, e.g., body parts, for virtual people and tag those objects as "skinny," "chubby," "average," "attractive," "ugly," "young," "old," etc. Note this tagging could be applied to the 3D model or textures alone or the entire object package comprising the model and its associated textures. The developers could similarly tag clothing textures, or objects, as "casual," "business," "formal," etc. in order to indicate style. These tags could then be used via a game script, static game code, development systems, or otherwise, to create virtual people to suit a given required game context. If game designers wanted to create a scene located in a fast food restaurant, the designers may create the virtual people using a higher proportion of body part objects tagged "chubby" and clothing textures/objects tagged "casual." In contrast, if the designers were creating a scene at a luxury hotel, they might use a higher proportion of clothing textures/objects tagged "business" and "formal." Because these tags are non-hierarchical and free form, designers can create different conceptual ideas for tags as they see fit. In this way, different tag usage that is layered and not preordained can be obtained. For example, a designer might, in addition to the tags above, tag objects with concepts like "sporty," "hipster," "emo," "preppy," "nerdy," "luxury," "basic," "new,"

"worn_out." This would allow an object to have a layered set of tagging like "preppy" and "casual," "preppy" and "sporty," "casual" and "nerdy."

This data can be used with the assets in several different ways. For example, this data can be included in the data structure for the asset itself. It could further be included as a separate file or set of files that track the metadata for a collection of assets. Alternatively, the metadata and/or the assets themselves can be housed on a server and accessed as through an application programming interface (API) that provides the requested assets according to the requests. This data can also be embodied in a number of different formats, such as Extensible Markup Language (XML), delimited text, binary encoding, a relational database, or other formats that would be readily applied by persons of skill in the art. Many tags are used to link models and textures together during game operation. These strings need not be user readable text at runtime and may exist only as unique hash values because there is no need to expose the clear text details to end users of the game.

The systems and methods of the present disclosure further advantageously use the metadata via a rule set layer that uses the metadata to increase the speed and efficiency of: game rendering, world or scene creation, game script execution, and rendering fidelity. In particular, the rule set allows designers to add context to the tags and to control their use by setting rules for the asset usage and the assets interaction with the game and other objects. These rules are unrestricted and can be used to provide a wide variety of different capabilities and restrictions for objects.

For example, assume a player clothing "jacket" object is created. A corresponding tag called "additional_top_garment" could also be applied to the jacket object. A further rule could then be added to the rule set to define game actions that arise from applying the "jacket" object to a character. For example, regarding game play the rule might look for the tag "additional_top_garment" and in a cold environment lower the character's health stat more slowly because the character is kept warm. As a different example, the "additional_top_garment" tag could also be used to improve rendering efficiency. A virtual character asset may include a "shirt" texture applied to the character's torso, like a shirt on a person. This shirt texture takes a certain amount of memory and processing power to render. Much of those resources will be effectively wasted when the character also has an "additional_to_garment," like the jacket, which obscures most of the shirt. To increase rendering efficiency, the rule set could be used to include a rule that automatically swaps out the full shirt texture for a smaller bib sized shirt texture that contains only the parts visible under the jacket.

As a further example of rule set usage, a developer may create a tag called "disguise" that could be applied to garment objects, such as a handkerchief tied around the face, a mask, or some other sort of costume. A game level designer could design a level by placing objects tagged "disguise" in the game environment. These tags could also have game consequences. For example, a character with a garment tagged "disguise" might not appear on the game map, whereas undisguised characters would appear on the map.

As another example, an older run-down neighborhood could be created by populating it with a higher proportion of assets tagged "old," "worn_down," "rusty," "cheap," etc. In game play where the player is attempting to improve the city they live in, as the player performs well in the game the game engine can slowly replace the objects tagged as described above with objects tagged "new," "high-end," "hipster," "renovated," etc. to indicated that the neighborhood is improving.

The combination of tags and the rule set can also be used advantageously for procedural generation of game objects and environments. For example, a game scene could be created in a game script by calling assets based on tags, rather than calling the assets explicitly. For example, if the game scene called for virtual characters in a movie theater, the game designer could simply specify a need for predetermined X number of characters, with casual dress. If the designer wanted a sci-fi movie playing at the theater, it might also call for a higher percentage than normal of characters tagged "nerdy." The metadata ruleset interface would interpret these general instructions at game runtime to randomly generate virtual characters fulfilling those needs.

Moreover, application of the ruleset to generate virtual characters can provide further opportunities for efficiency optimization. For example, the entire character object, e.g., the model and associated textures, does not need to be packaged prior to being streamed to a graphics processing unit (GPU) for processing. Instead, the virtual characters can be generated in the GPU from existing model and texture assets. Moreover, the rule set can include efficiency rules that favors creating characters with textures already loaded in the GPU to the extent it can be done while retaining realistic variety in the scene. This preference for already loaded textures could also be adjusted up or down by the rule set based on the rendering loads, such that an optimal balance of variety versus computational load. In other words, the preference to increase efficiency and use pre-loaded textures can be increased for complex scenes with a lot of objects and reduced for less complex scenes.

In one embodiment, the ruleset is generated from the asset metadata. In this way, the ruleset is not an explicitly pre-defined rigid set of controls for the tags. Instead, ad hoc rules are created as needed for particular assets as they are developed. For example, a particular asset can be created with associated XML metadata that includes property tags, match tags and restrictions. This collection of information is interpreted to act as the ruleset. For example, the XML data for the assets can be concatenated into one or more files that are parsed by the ruleset interface to respond to asset requests.

FIG. 1 shows a schematic view of an exemplary work flow for creating an asset according to the present system. First, an asset is created and defined 10. This can, for example, be done by a technical artist that defines the needs of a particular world and the characteristics of an asset. This creation is at a minimum the generation of a record for the asset and entry of the asset into the content management system. If the technical artist decides a "heavy winter coat" asset is needed, she can create a XML definition of the coat asset and its associated restrictions and dependencies. This results in an XML file 11 being generated defining the object, which now "exists" in the context of the overall design of the game, but the specifics of the model have not yet been defined. For example, the technical artist might decide that the coat object is a winter coat and that it increases a character's stamina in cold climates. These details would be established through appropriate metadata tags applied to the object. This object can then be passed to a content management system, such as asset control system 13.

A character artist can then take the description and create a 3D model and texture 15 according to the description and output the completed model 17 back to the asset management system. This can, for example, be done using known 3D modeling software, such as Autodesk 3ds Max (formerly 3D Studio Max) developed by Autodesk Media and Entertainment. The character artist can further edit the XML data as needed, such as to add/modify restrictions or other tags. Note, while this example describes separate artists working together to create the final model and XML, this shows the flexibility of the system but should not be considered a limitation of the disclosed system. A person of skill in the art will readily understand that the present work flow could be accomplished by one or more people, with the work load spread in a variety of ways.

As shown in FIG. 1, in an exemplary embodiment, the metadata concerning an asset 11 and the asset itself 17 are maintained as separate files. In such a situation, the metadata and the corresponding model/texture asset data can be linked by a unique identifier (ID) such as a name. The metadata portion also may not, necessarily, be maintained as individual files. The metadata could also optionally be stored in a database structure with each asset having an associated record in the database. Or they could be maintained as one or more individual files, which provides a simple way to allow people to work on different assets simultaneously while avoiding conflicts.

Figure 2:
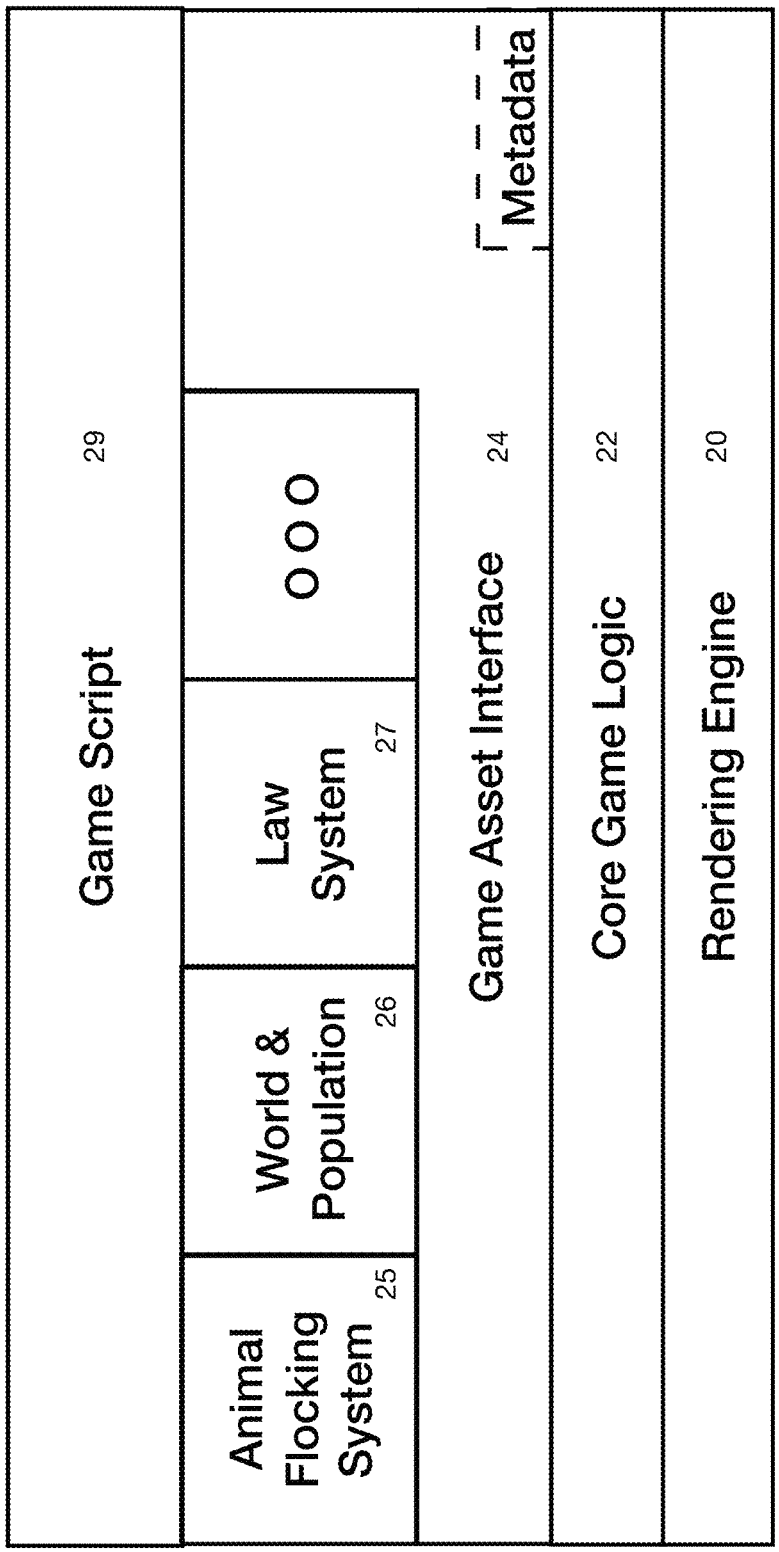
FIG. 2 is an exemplary diagram illustrating one embodiment of a game system suitable for use with the disclosed metadata system of FIG. 1.
Figure 3A:
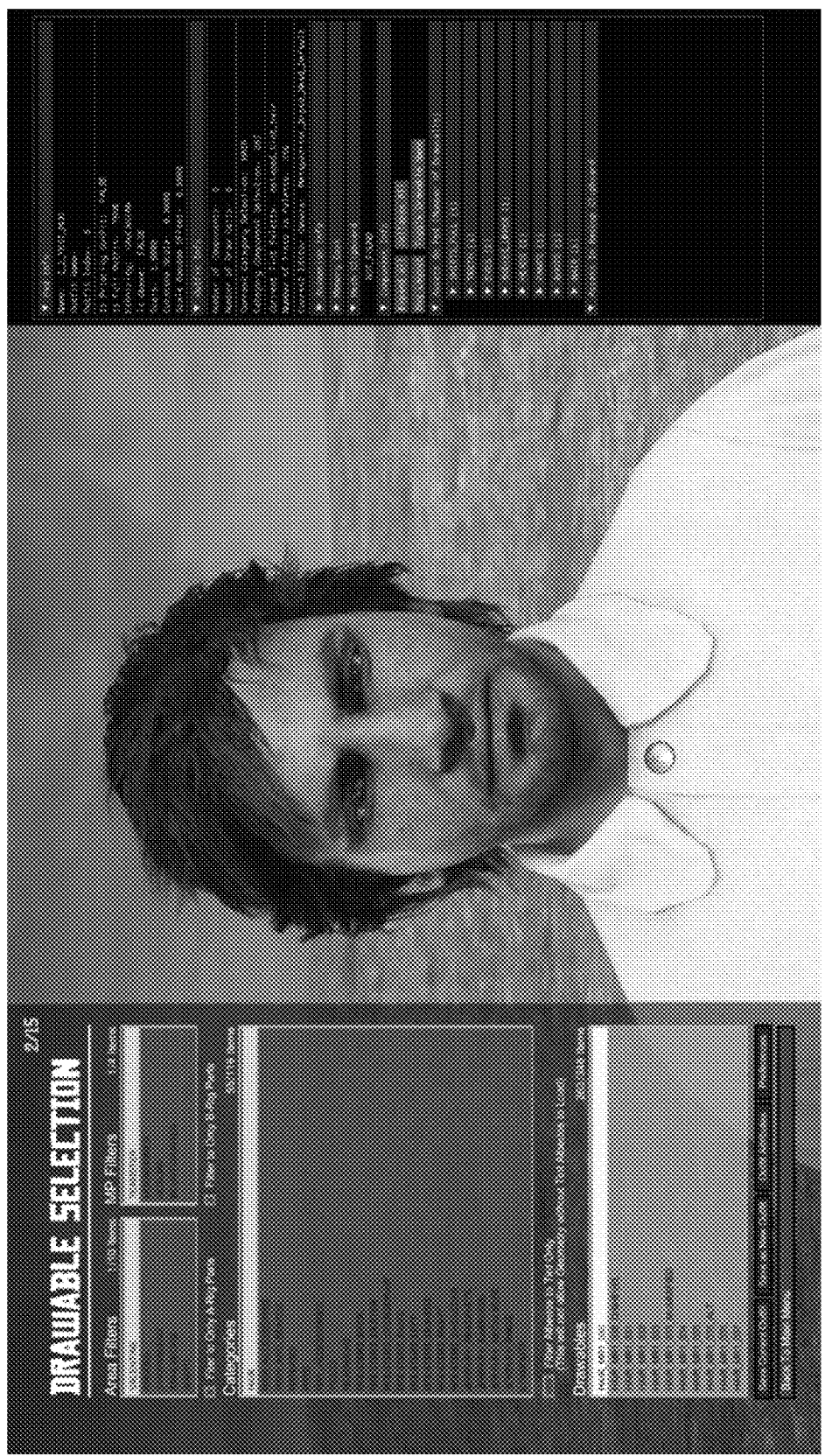
FIGS. 3A-3E are exemplary interfaces illustrating one embodiment for selecting assets using the disclosed metadata system of FIG. 1.
Figure 3B:
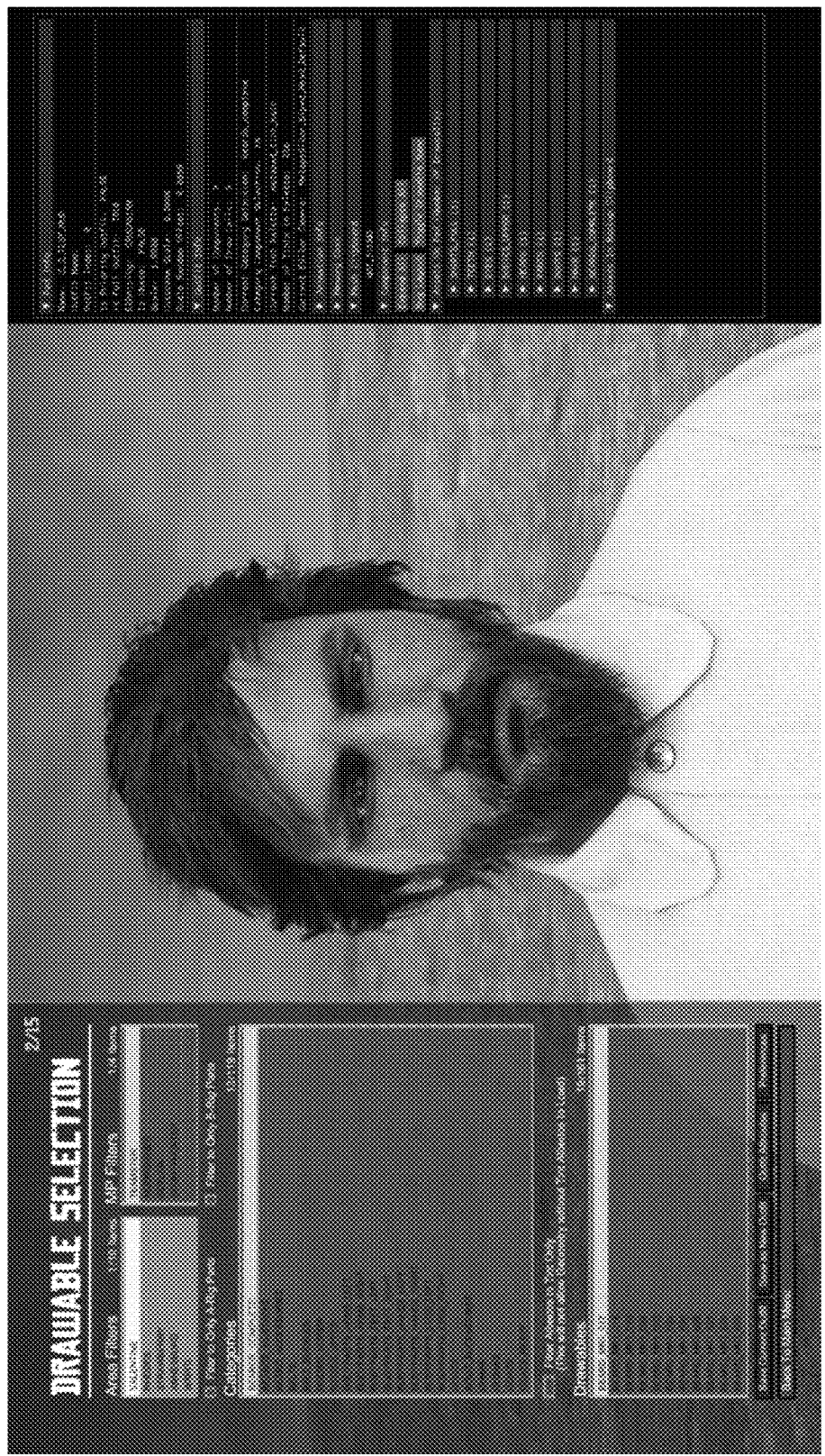
Figure 3C:
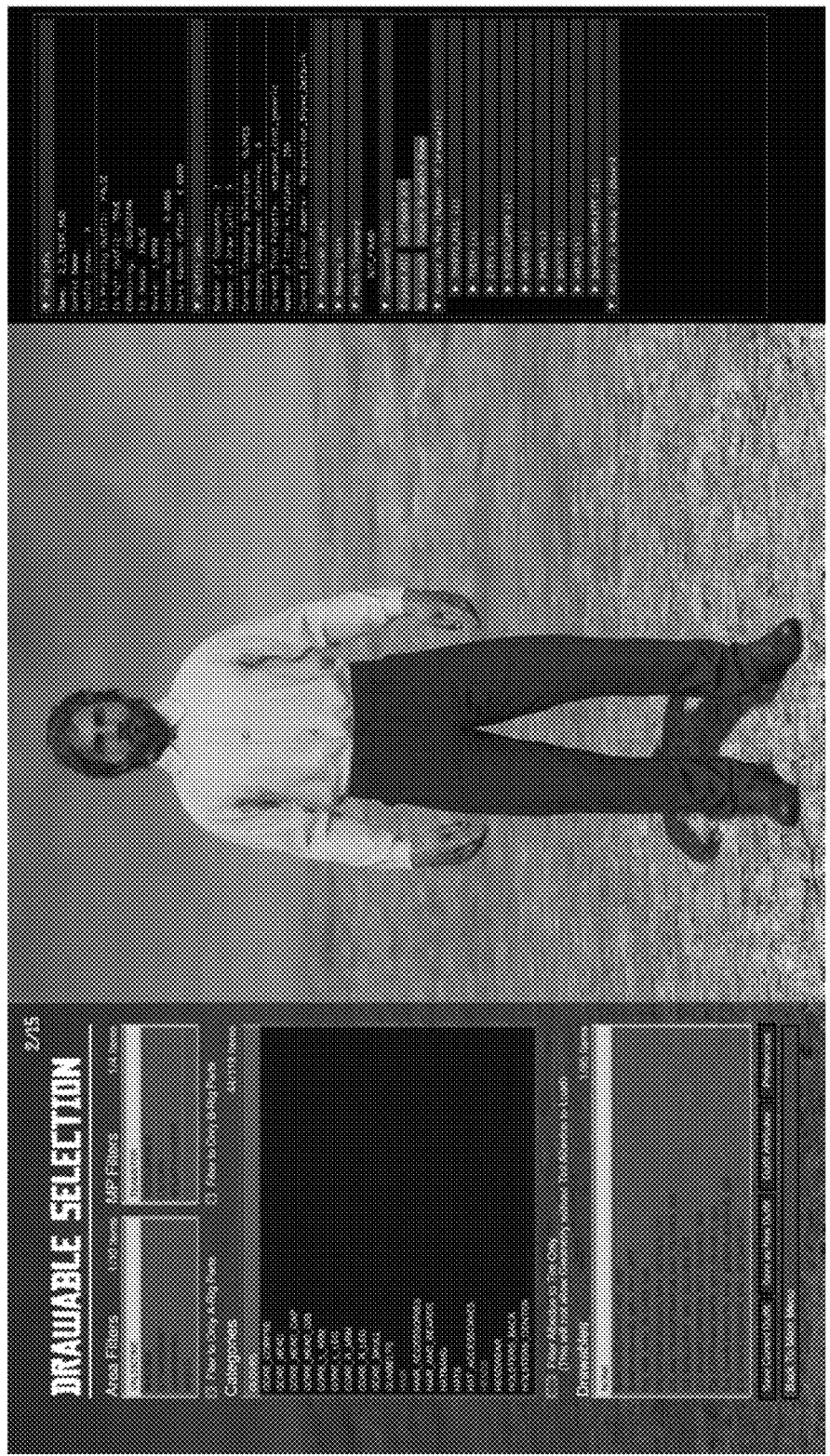
Figure 3D:
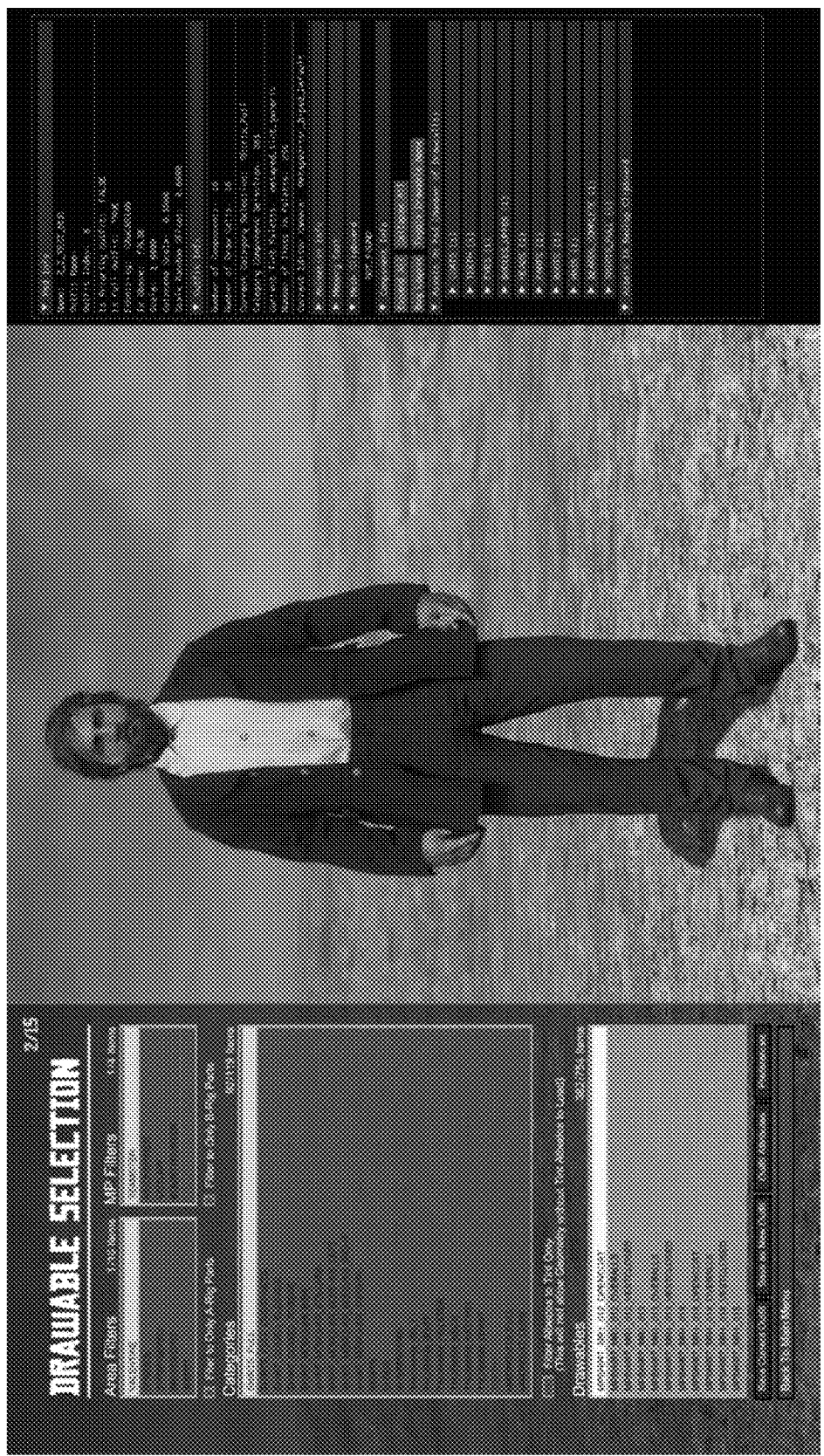
Figure 3E:
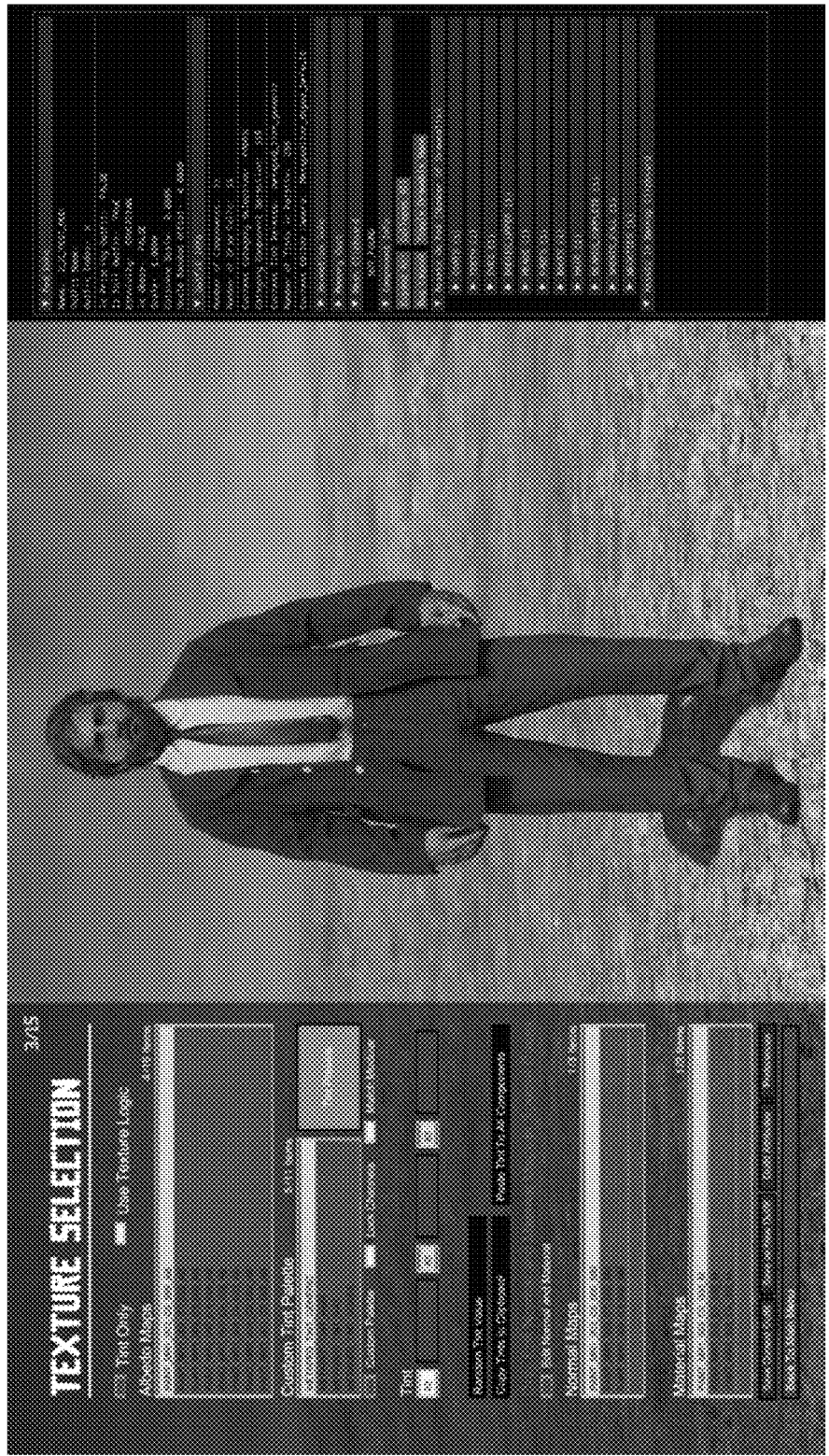

FIG. 2 shows an exemplary embodiment of a game architecture consistent with the present disclosure. At the lowest level of the architecture is the Rendering Engine 20 which is responsible for creating the 3D environment of the game, as will be familiar to persons of skill in the art. Significant portions of this layer are often executed on a system's GPU. One layer up is the Core Game Logic 22. This game logic layer and the layers above are largely executed on a system's central processing unit (CPU). This layer is responsible for executing the main functions of game such as, responding to user input, controlling game operation, etc. This layer also streams the assets from disk to memory and feeds the rendering engine with relevant data.

The Game Asset Interface layer 24 sits above the Core Game Logic and provides an interface to the ruleset and metadata asset generation process. This architecture provides an advantageous interface for in-game asset generation that can be used by a number of different systems. In a particular advantageous embodiment, the Game Asset Interface layer 24 provides for asset requests with varying degrees of specificity. For example, a new character request can be loose (generate one 'nerdy' character), increasingly specific (generate 'sheldon wearing the doppler effect costume'), or somewhere in between (generate 'sheldon'). When the requests leave character details undefined, the Game Asset Interface layer 24 fills in the unspecified details according to the rules set. The Game Asset Interface layer 24 is access by a number of "clients." For example, a Game Script 29 system provides a mechanism to describe a particular use of an open world game. For example, a script might describe a certain mission for the player to pursue. The script would then operate to carry out all the details of the mission. If the script needs to generate a character or other asset, it would access the Game Asset Interface layer 24 providing as much details as appropriate as discussed above.

A number of other environment systems could also use the Game Asset Interface layer 24 as clients to generate in-game assets, either under control of the Game Script 29 or independently. For example, an "Animal Flocking System" 25 could control the generation of animals and their group behavior. Such a system would interface with the Game Asset Interface layer 24 to request the needed animal assets. Similarly, a "World & Population System" 26 could control the distribution of characters and assets specifically per 'zone' (e.g., generate ten 'cowboy', generate 'sheriff McCoy'). Similarly, a "Law System" 27 might operate to generate law enforcement character assets in response to the player or other characters committing a crime in the game world. A person of skill will readily understand that a number of similar client systems could be created as would be relevant for a particular game type. For example, a game set in outer space might have an "Asteroid Generation System."

While the architecture shown in FIG. 2 shows the general hierarchical relationships among the various layers with executive control generally flowing down from higher layers to lower layers, it should be noted that this does not strictly match the data flow and control flow among the components shown. There might be situations where lower layers, like the Core Game Logic, send data or control to higher layers like the Game Asset Interface or the client systems. For example, the Core Game Logic may be hard coded to use the "Law System" to generate law enforcement characters in response to certain player actions. Or it might directly access the Game Asset Interface to initialize a game world. Similarly, the "World & Population" or "Animal Flock" subsystems might be directly integrated into the Core Game Logic to periodically assess the world and ensure that is sufficiently natural and varied looking.

Turning to the details of the specified metadata, in a particularly advantageous embodiment the following metadata is included, for each model and texture, IDs, property tags, match tags, randomization restrictions, expression data and optimization data. While this selection of metadata has been found advantageous, different groupings and subsets of these tags can be mixed and matched as needed to accomplish particular design goals without departing from the spirit and advantages of the present disclosed inventions. The uses, embodiments, and benefits of each of these fields are described as follows.

IDs

Multiple IDs for the models and the textures can be used in embodiments that employ them. A first ID serves as a unique identifier for each model or texture. This ID can be used like a name to identify and match models or textures at runtime. A second ID is optionally used to identify a higher resolution version of the objects, e.g., the second ID acts as a pointer to the higher resolution version. The game engine can advantageously use the higher resolution version of the element to swap out for the basic element in certain situations, such as during cut scenes or when the asset is close to the camera. A third ID can optionally be used to match the asset to a localized string, e.g., a text description of the object in a language for a particular locale. This ID is used in certain scenarios such as an in-game shop for the end user, e.g., "red shirt" in the U.S. and "camisa roja" in Spain.

Property Tags

In one embodiment, the metadata further includes Property Tags, which as previously discussed, permit developers to include open-ended and unrestricted characteristics about the underlying asset. These tags can, for example, name the type of the object, e.g., hat, shoe, gun, etc., or they can provide a quality characteristic, e.g., new, old, preppy, grungy, red, green. These Property Tags are used for a wide range of purposes. Advantageously, due to their open-ended nature they can extend functionality without requiring changes to the code. Specifically, a developer can conceive of an entirely new concept or relationship for an asset, name it in the Property Tag. Once the tag is created, it is recorded in the metadata and can be used in a game script to some effect. In practice, the design ordering can vary as needed. For example, a designer might have an idea for a game mode and a corresponding script, which would result in a request for the technical and character artists to create necessary assets with proper tags. Alternatively, the assets might be created with certain tags that are later discovered by a game designer and used in a script.

Property tags used by design or various code systems have particular requirements known by the development teams without the need to programmatically enumerate them. One such example is the "is child" tag used on certain model parts to broadcast to script and code that a character happens to be a child. In this case, the developer needing this feature, e.g., to distinguish between adults and children, requests the relevant assets to be tagged with this tag and the developer can then use this new concept in the game script as required.

Match Tags

In one embodiment, the metadata further includes Match Tags. Match Tags are used to link models and textures together. For example, a single 3D model, such as a hat, might have a number of different available textures that could be applied to it to give it a particular look, such as straw, felt, leather, etc. A designer can then choose to filter all models by the "hat" Property Tag to obtain a list of possible hats.

Once a specific hat model is selected, the Match Tag of the selected model is used to cross-reference suitable textures to use with the selected model. These textures can be further filtered by their Property Tag characteristics. For example, the filter "red" can be used to select textures for the selected hat model that are also tagged "red." The Match Tags can further be used to match related models. For example, a modern design dining room table might have a Match Tag that links it to correspondingly matching chairs models.

The following metadata shows an exemplary usage of the Match Tags.

```
<Item>
   <guid>shirt_000_model</guid>
   <matchTags>
      <Item>shirt_000</Item>
   </matchTags>
</Item>
<Item>
   <guid>shirt_001_model</guid>
   <matchTags>
      <Item>shirt_001</Item>
   </matchTags>
</Item>
<Item>
   <guid>shirt_000_texture</guid>
   <matchTags>
      <Item>shirt_000</Item>
   </matchTags>
</Item>
<Item>
   <guid>shirt_001_texture</guid>
   <matchTags>
      <Item>shirt_000</Item>
      <Item>shirt_001</Item>
   </matchTags>
</Item>
```

In the example above, two shirt models (shirt_000_model; shirt_001_model) and two shirt textures (shirt_000_texture; shirt_001_texture) are defined. The models and textures are matched by determining if they have the same match tag. Thus, in the example above, shirt_model_000 would match with either texture shirt_000_texture or shirt_001_texture because all share the same shirt_000 Match Tag. On the other hand, shirt_001_model would only match with shirt_001_texture. In other words, shirt_001_texture is suitable for two models, but shirt_000_texture is only suitable for one model.

Note, as discussed above, the content of the tags, e.g., shirt_000_texture, is advantageously freeform and expandable by the developers as needed. The format of the tags, however, e.g., "<Item> </Item>", is defined within the system.

Randomization Restrictions

In one embodiment, the metadata further includes Randomization Restrictions. An asset can be added to the game in two different ways, "explicitly" or programmatically through its "tags." When an asset is added explicitly in the game, all data required (model and textures) is specified by name through its unambiguous IDs. This allows a designer, or the game logic, to pick an asset with precision when that is desired. With precise selection the asset generation is performed in the game as an atomic operation, meaning it is selected without running any randomization algorithms.

In contrast, when an asset is selected via its tags a process is run to select a particular asset from one or more tagged options. This provides the advantages of populating worlds with objects easily by specifying characteristics. The process of using tags to select objects can be expanded to include a number of advantageous features. For example, one programmatic operation for performing this process can be broken down into the following steps:

1. Using a specified tag (e.g., "hat"), find a list of models that contain the tag in their property tags list.
2. Randomly pick a model from the list to use.
3. Using the match tags from the chosen model, find a list of albedo textures that contain one or several of the match tags.
3a. Optionally use additionally specified tags (e.g., "red") to filter the list of textures.
4. Randomly pick a texture from the resulting list.
5. Repeat steps 3-4 for normal and material textures.
6. Apply randomization restrictions.

At step one, the designer or the game script, can specify the asset of interest, such as a hat. The Property Tags of the available assets are searched for matches to the specified asset. In one advantageous embodiment, the identification process is further enhanced by an optional synonym expansion. For example, the request for a "hat" would also automatically identify objects tagged as a "baseball cap" or "fedora." This request could also involve additional property tags to further narrow the search, e.g., woman's, which narrow the search to hat models suitable for equipping on a female character. These filtering requests can also include negative terms, e.g., find models tagged "hat" but not "fedora."

With the available set of model assets filtered by the requested tags, a particular model is selected at step two. This selection can be implemented simply by using one of the many available pseudo-random selection algorithms known in the art, or any other randomization process. Alternately, this process can include additional selection preferences that skew the selection from being purely random. For example, the memory budget for the game can be used to skew selection towards assets already loaded in memory rather than increasing the memory load by adding new assets not currently in memory. In this way, a tradeoff can be made between efficiency and visual richness when the game is resource constrained. This could, for example, be advantageously implemented by adding code that rejects assets not loaded in memory when the memory budget is exceeded. As a further specific example of such an embodiment, when the system filters a request for assets it generates a list of assets that passed the search criteria. A single random pick is then made from this list to get the asset to be used. However, when a budget driven restriction is wanted, a reservoir sampling randomization algorithm is used to randomly pick a subset of the assets from the list. This makes it possible to pick from the subset of assets already in memory, which respects the budget restriction and still getting a random selection. The budget restriction would in turn be driven by a higher-level system like the world and population system or even script. The decision to restrict asset selection could be dynamic and not follow a hardcoded threshold. In that way, it would depend on the situation that plays out at any given time in the game simulation. A scripted mission taking place on a busy street might have a known high cost in memory and would require character assets to be restricted, while an event taking place in the wilderness would be comparatively cheap and could utilize as much variation as needed.

With the model selected, one or more textures are typically applied to the model to make it suitable for rendering in the game. At step three, a set of available textures for the model are identified using the Match Tag. Optionally, at step 3.a, further filter tags, e.g., "red," can be applied to narrow down the set of textures to choose from. In a preferred embodiment, the system does not need information concerning the semantic meaning of the tags and works blindly with hashed values of their names. Because of this, the tag 'red' is only meaningful to the users of the system. This approach advantageously adds flexibility because content creators are allowed to add their own meaning to tags as they desire. The developers can use these tags, such as 'red,' in a script as needed for a particular scenario, without the complexity of programming a semantic knowledgebase into the system. In alternative embodiments, semantic context can be included in the system to allow automated rules and restrictions based on the meaning of tags. Alternatively, a mixture of pre-defined tags semantically meaningful and freeform tags could also be used.

In step four, a random selection is made, such as the process described with respect to step two, to select among the available options.

As described in step five, the processes of steps three-four are repeated for other necessary textures such as a normal texture and a material texture. In this particular embodiment, albedo, normal, and material textures are identified. A person of ordinary skill in the art will readily recognize that the number and makeup of textures selected via this process can be changed to match the rendering requirements of a particular system. For example, only one texture or a different mix of textures may be used as desired. The order of the texture selection can also be adjusted as needed, for example upon selection of the first texture, the textures available for subsequent selections may be narrowed via the Match Tags. As a further alternative, in some embodiments sets of suitable textures might be grouped together, such that the first selection process immediate identifies the plurality of textures to be used in rendering the asset.

At step six, the asset combination identified in the prior steps is applied using Randomization Restrictions. The Randomization Restrictions function as a set of primitive instructions executed to use the asset in a suitable way. For example, Randomization Restrictions include "add," "remove," and "replace." The "add" instruction adds another asset along with the first asset if it is a prerequisite. For example, if you add a lifeguard shirt to a character the add restriction also adds a whistle. The "remove" restriction removes an asset from the character, if an asset containing that tag in its property tags list exists on the character. For example, if a bathing suit object is being selected by the process of steps 1-5, the remove restriction will be associated with the bathing suit model in order to remove the model's outer clothing. The "replace" instruction acts as a combination "remove" and "add" instructions and works in an exclusive manner such that a "replace" operation only completes if the removal was successful, i.e. if the "remove" part of the operation found an asset to remove from the character.

In one embodiment, the selection of each model or texture restricts the follow-on selections via Match Tags to avoid incompatibilities. In an alternative advantageous embodiment, the randomized restriction triggers steps 1-6 recursively until all restrictions have been satisfied when an asset is used. For example, a game script or design process may attempt to equip a scarf on a character that happens to have a large beard model. The scarf and large beard are incompatible because they will intersect in a way that was not accounted for in their design. The recursion process will attempt to accomplish the scarf equip request by using the scarf match tags to find a suitable smaller beard model that is compatible with the scarf or by removing the beard entirely.

The Randomization Restriction system results in a simple yet powerful domain language that can be used to pick models and textures from a large pool of assets and create unique looking characters while ensuring the outcome is a valid. As an alternative advantageous example, the replace restriction can be used to increase rendering efficiency. For example, if a character is equipped with a jacket, vest, or sweater object it will largely cover the character's underlying shirt object. Despite this, in typical rendering pipelines every object must be loaded into the rendering pipeline and considered by the available algorithms, at least to determine occlusion by other objects. The replace restriction can be used to replace a character's full shirt model with a more limited model only includes the parts of the shirt that will be visible under the over garment. Thus, the expense of loading and rendering the mostly occluded full shirt model is saved. Moreover, all of this is done automatically by the Randomization Restrictions, without burdening the designers to specifically account for these special cases.

Expression Data

Expression data is an additional optional metadata field that can be specified for models. It is used to convey artist defined control information to the animation system. An example of expression data for a hat model may include driving the animation of a character's hair to squash it down and not intersect the geometry once the hat has been placed on the character's head. This can be embodied, for example, by the expression data including an identification of a pre-defined animation. Alternatively, the expression data can directly include information, e.g., variable values, to be added to the model for use by procedural rendering system. For example, if the character has a ponytail, characteristics can be provided that are used by the game's physics engine to specify the mass, movement, and connections of the ponytail with respect to the character for use by a physics engine to derive the desired motion of the ponytail in the game.

In one embodiment, the Expression Data is defined by an expression ID and a numerical value. The ID allows us to identify what exactly is needed to procedurally move on the character and the numerical value the extent of motion. When an asset is equipped on a character, if it has expression data available, it is added to the model at that time. In this way, for example, a character with large hair putting on a hat will then result in the hair being squashed down realistically, where otherwise it may have created a conflict where the hat intersected the hair geometry.

Optimization Data

Optimization Data is an additional optional metadata field that can be tracked for the models and textures. This allows a designer to pass information to the rendering system to enable it to make better decisions about how to improve performance when needed. For example, the rendering system may be set with a maximum allocated time limit to complete rendering in order to maintain desired real-time rendering performance or frame rate. Thus, in executing within these constraints rendering system ideally creates the best look it can for a given amount of allotted rendering. In scenes with relatively fewer, or less complicated, objects the rendering system may be able to complete all rendering with the highest expected fidelity. However, for scenes with relatively more, or more complicated, objects the rendering system may not be able to render all objects at the highest fidelity in the time allotted. When faced with these more complicated scenes the optimization data can allow the system to prioritize which details should be dropped first from rendering to maintain desired performance.

Examples of Optimization Data, include lodThresh, shaderId, slodLayer, slodMask, slodColor, which are defined and used as follows.

lodThresh0 & lodThresh1

Each model can have, for example, between one and three levels of detail (lods). The high lod is the most complex geometry and is rendered when the asset model is close to the game camera, while the medium and low lods are optional and are generally rendered at predefined medium and far distances from the camera. If a model only has a high lod, it will render this at all distances. But this is not efficient because a model far away from the camera does not need as much geometric complexity because it occupies relatively fewer pixels on the screen. In order to lower the burden on the GPU, the rendering system can detect if an asset has a lod threshold value specified and use it to swap between the medium and low lods. These thresholds are specified in the Asset metadata through the lodThresh0 field, which specifies the distance where the rendering engine should swap from the high lod model to the medium lod model. The lodThresh1 field is similarly used to set the distance to swap between the medium and low lods. If a model only has one or two of the three lods, the lod threshold metadata values can be used as a cut-off point to tell the rendering system to stop drawing that particular model entirely. For example, a pair of glasses is normally a very small piece of geometry with a single high detail lod. For this asset then, the lodThresh0 field can be set to a virtual game distance like 10 meters. When the glasses reach that distance from the camera the lod metadata specifies that the object no longer needs to be rendered because the user would not see that detail at that distance. While this exemplary embodiment uses three lods and, therefore, two threshold tags to separate them, more than three lods could be used with a commensurate number of lodThresh tags to respectively set the changeover points between them.

slodLayer, slodMask, slodColor

The previously mentioned lods are typically specified on a per model basis (e.g., each model has between one and three lods). There is an additional advantageous embodiment in which a superlod (slod) can be provided. The slod is a single, geometrically simple, model that can be used for a variety of distinct models. For example, a character slod would render at a predefined (and large) distance for many characters in the game, such that only one or a handful of different slods would be needed to represent all characters. This is because characters at a distance are largely indistinguishable. As another example, a slod could be used for a group of distinct cars at a large enough distance.

Figure 4:
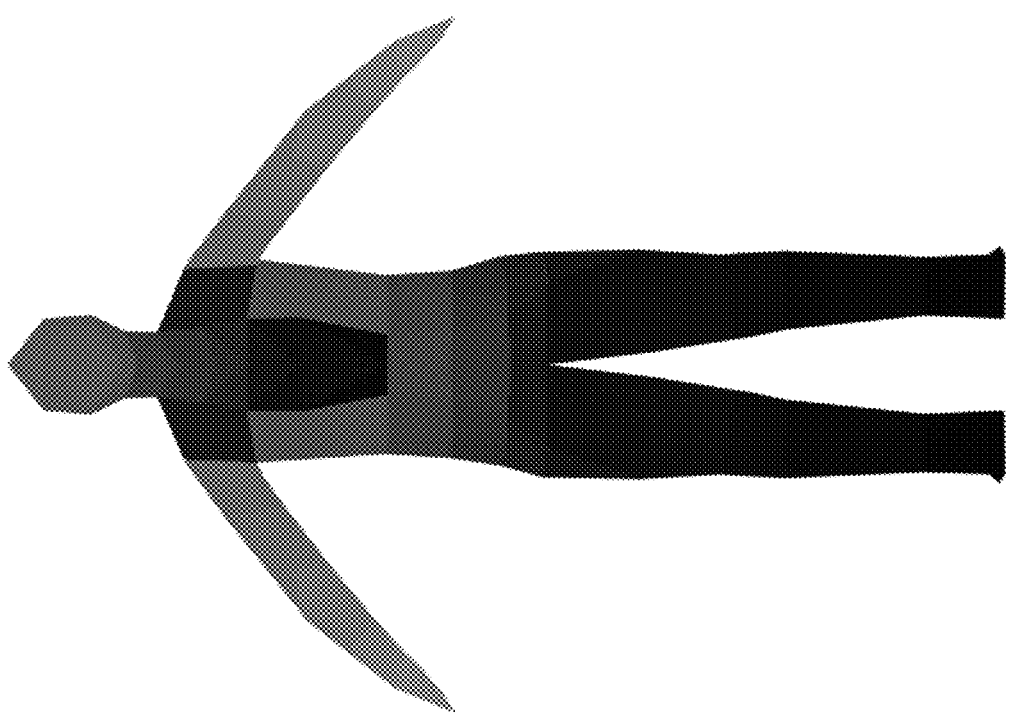
FIG. 4 is an exemplary diagram illustrating one embodiment of a super level of detail for use with the present disclosure.

In some instances, a number of slods may be needed because characters might be distinguishable by their silhouette even at a large distance. For example, a male character wearing pants has a different silhouette (and slod) than a female character wearing a dress. In addition to silhouette, color may also be a distinguishing characteristic that is discernable at large distances. The metadata can advantageously be used to access the particular slod variant needed for a particular asset by specifying the slod for a model and certain color details. For example, two otherwise identical characters wearing a red and a blue shirt both need to be represented by the same slod model. This is accomplished by splitting the slod geometry into sixty-four regions, as shown in FIG. 4. Sub-assets on a character can then be directly mapped to one or more of the regions on the slod. This allows the system to propagate the asset's colors to those regions. For example, when the render system draws a slod model, it sends the colors for all regions to the GPU to tint the regions as required.

Each model's metadata, therefore, can contain a slodLayer field and a slodMask field. The slodLayer is a numerical value the artists choose that defines on what level that particular garment sits on the character. Skin is on the lowest level followed by a t-shirt at a higher level, followed by a hoodie, followed by a jacket, etc. This allows the system to handle overlapping assets and color the slod regions with the topmost garment's color correctly. The slodMask is a field that specifies which of the sixty-four regions of the slod the particular model covers, e.g., pants would cover the leg regions of the model. While the slodLayer and slodMask fields are only required for models, the slodColor is only required for textures (specifically albedo textures). The slodColor field contains the average color for the texture as perceived from a distance, which can be set manually or automatically.

shaderId

When an artist exports a model, the exporter checks what shader the model uses and places the ID in for that shader in the metadata for that model. At runtime, when a character is created, models can then be sorted by their shader IDs. This allows models using the same shader program to be rendered in batches, which provides a more efficient use of GPU resources and increases performance.

Character Outfits and Category Tags

In another advantageous embodiment a set of tags, which could be a subset of the general property tags, are classed as "category tags." A category tag represents a group of assets of a particular type, such as "hats," "heads," "boots," "hair," etc. These categorized tags have built in associated rules within the system. For example, a set of objects can be classified through a category tag as being interrelated and necessary for building a composite object. For example, all the parts of a character can be specified with a category tag, which allows a character to be built by selecting an asset for each category in the category tag set. This has the added benefit of blocking the creation of invalid characters. For example, a character with only arms and legs but no torso would be blocked because it does not have an object from each of the categories in the body set. Similarly, the category tags can specify that only one asset can be added per category, which makes it impossible to create an outfit with, for example, two hats. To accomplish a restricted action, the rules would have to be overridden by expressly adding or removing related categories, such as by specifically creating a "secondary hat" category to enable the use of multiple hats. These category rules can be created by a separate metadata description that groups tag classes to create category relationships.

Character Creation Tool

While the overall game design team often modifies characters at runtime through the tagging and scripting systems previously discussed. Many characters in game are created as fully predefined by the art team with specific default outfits. This can be done more advantageously in the context of the current disclosure through the use of an in-game tool used to create characters and store their looks in additional metadata files as list of outfits. This tool provides a user interface to the metadata search system to enumerate available models and textures and allows artists to pick and choose as required to build a character while maintaining full control of the art direction.

An exemplary embodiment of such a tool is shown in FIGS. 3A-3E. The user interface for the character creation tool provides a view of the character in the center of the window with the current selection of characteristics shown on the character. As shown in the FIGS. 3A-3E, the character's look changes as different options are selected. The box on the right provides details regarding the current status of the character and its equipped elements, such as garments, hair and other characteristics. The filter boxes in the upper left corner show categorization of the assets. For example, the area filters are based on in-game locations. This allows artists to filter the available models and textures based on these tags and focus on creating outfits for specific locations without worrying about choosing unsuitable assets. If any, filters have been applied, the Categories box allows for further filtering based on asset types. These are the predefined categories such as heads, skirts, beards, etc. With a category selected, the bottom Drawables box displays the resulting list of assets that passed all criteria. Selecting one of these will instantly updated the character on screen with the new asset and provide visual feedback.

Category tags are ideally explicitly broadcast to designers. To offer a useful workflow for the designers and artists using the system, in one advantageous embodiment, an offline tool is provided to parse the category tag metafile and create an enumeration type inside the scripting environment with every category tag as an entry. If a typed game scripting language is used, the script commands will need to pass specifically encoded values—in some cases these take the form of enums. As such, rather than ask for a character that has a "hat" as a loose string, it is encoded in an ID available to the designer as a named enum, e.g., CHARACTER_ITEM_HAT. This provides consistency and helps prevent errors. In an alternative embodiment where this enumeration process is not used and tags were simply un-enumerated strings, the system would not easily detect which metadata is being used. This could result in an item getting deleted, but scripts still referencing it, which would cause errors when use of the sought after asset is attempted.

Using the enum approach avoids this. The enumerated tags hook directly into the scripting language. Accordingly, the scripting language system is provided with an easily accessible list of all category tags available, which can be reviewed by designers developing game scripts. It also allows a compiler to check the script to ensure that all tags in the script are valid and being used correctly. In addition to category tags, character outfit names and a set of various other significant tags required by the design are also exposed to script and the designers using the script through this offline tool, which can essentially create a dictionary of available tags.

Exemplary Metadata

While any number of formats can be readily employed to define the metadata disclosed herein, one advantageous format is shown in the example of a beard model as follows:

```
<Item>
    <guid>beard_ms1_dummy_000</guid>
    <propertyTags>
        <Item>Ambient_Character </Item>
        <Item>beards_complete</Item>
        <Item>dummy_beard</Item>
        <Item>hide_in_fpv</Item>
        <Item>hair_material_value</Item>
    </propertyTags>
    <matchTags>
        <Item>hair_gen_999_ab</Item>
        <Item>hair_gen_999_nm</Item>
        <Item>hair_gen_999_m</Item>
    </matchTags>
    <restrictions>
        <Item>
            <remove>beards_all</remove>
        </Item>
    </restrictions>
    <slodLayer value="2" />
    <slodMask value="4294967296" />
</Item>
```

The above exemplary metadata file, uses an XML style description having an <Item> tag as the top-level structure. The <guid> tag contains the item's unique ID. The <propertyTags> tag includes five exemplary Property Tags for the item:

Ambient_Character: identifies this asset as an ambient asset. This is used to filter all assets that are only suitable for ambient characters and not any of the more detailed story, cut-scene, or player characters.

Beards_complete: This is the category of this asset and indicates this is a beard model.

Dummy_beard: The dummy_beard tag actually indicates that this is not a real visible beard and instead is a "dummy" beard, meaning the asset exists logically but has no geometry visible on the character. This shows a flexible and creative use of the disclosed metadata architecture. A character with a beard equipping a bandana would result in the bandana geometry intersecting the beard. One option would have been to use a restriction on the bandana to remove any beard assets on the character. The problem with this solution is that logically the character still has a beard, only it's not visible due to the bandana. If a client system was to query if the character had a beard, and the bandana removed it for visual purposes, the answer would be no, potentially resulting in the character losing its beard. With the dummy beard solution, the character still has a beard equipped and the lack of geometry doesn't cause issues with the bandana asset.

Hide_in_fpv: This tag is used to indicate that if the player switches the game camera from the regular third person view mode to the first-person view (meaning the camera is now inside the head of the player character instead of behind him), this asset needs to stop rendering. This is required for an asset such as a beard in order to not have the geometry render across the entire screen and intersect the camera view plane while in first person mode.

Hair_material_value: If a character was to be shot, the vfx system would create a bullet entry decal at the point of impact. This decal sometimes needs to be bloody, for example when the torso is hit, and sometimes it needs a variation of that decal. In this case, if the beard is hit by a bullet we would like to replace the default bloody decal with one more suited for hair geometry. This tag tells the vfx system what decal to choose.

The <matchTags> tag includes three Match Tags for the item, which respectively identify the albedo, normal and material textures for the model. The <restrictions> tag identifies restrictions for this item, which in this case specifies the removal of any pre-existing bears.

In another advantageous embodiment, the disclosed systems are used to procedurally generate building interiors, which allows the generation of large number of different interiors from a relatively small set of interchangeable part objects. These parts would include things such as floor assets, ceiling assets, wall pieces and numerous interior items for placement within the room. Variants of these items can be made available in several color palettes, which can be applied across the parts in a variety of ways.

Arbitrary room shapes and sizes, including outdoor space, can be populated using the disclosed system. However, in some advantageous embodiments this system is applied to rooms of similar shape and size, such as an apartment building where many rooms throughout the building would have essentially the same floor plan. Thus, the wall, ceiling and floor details can all be mapped to the particular dimensions of those rooms and the general placement of furniture and fixtures in the spaces would be similar. Accordingly, multiple apartment interiors can be easily created based on the same interior plan but with different combinations of parts and colors. This would give the impression of a great deal of realistic variation from a relatively small set of data. The various parts in the rooms can be tagged with characteristic data, such as the Property Tags, disclosed in the previous embodiments.

As with the previous embodiments, rules can be used to establish relationships between the various objects. This allows a selection of parts to be grouped together in an arbitrary way. For example, a bathroom group could comprise a group of tiled floors, tiled walls, baths, sinks and mirrors, together with a light blue and white color palate. Variations on this group could be provided by changing the colors, or the particular versions of the tiles, sinks, bath tubs, etc. The bathroom classification allows the statement of the needed parts, along with the ability to select variations of each of the constituent parts. The metadata for the individual parts can also include different levels of wear and tear. For example, the parts can be labeled high-end, low-end, new, or worn. This allows the creation of a high-end bathroom by specifying a bathroom with new, high-end tags, which will select the corresponding objects for inclusion in the room.

Rules can further be used through match tags, restrictions, and expression data to specify the relationships between the parts that exist in the interior. For example, rules that must be obeyed to make the interior appear realistic can be specified, e.g., a rug can only be placed on a floor. A table can go on top of the rug and a lamp can go on top of the table. The rules would allow a table or a chair to be placed on the rug, but would prevent a lamp from being placed on the chair.

The system of this embodiment includes a list of all the possible component parts that could be found in a particular interior. The list is further structured into an ordered graph that includes all of the required information about the relationships that these parts are permitted to have to each other. This graph would allow the system to enforce requirements such as that a floor object must be placed first in an interior. There would be an option to select one of a variety of available rugs to go on the floor at a number of suitable positions (or even to select no rug at all). The graph would also dictate the option to place some piece of furniture. This selection will then provide other options are available for further selection.

The graph would be a top down breakdown of any given interior down to all of the constituent items that can be placed inside it forming a tree. This establishes all of the possible objects which can be placed in any particular instance of this interior in the world, defines the relationship between them, and holds any other relevant data about those items that the game may need (such as selection tags). An exemplary graph structure is shown as follows:

High end apartment
  Kitchen
    Tiled Kitchen Floor
    Kitchen Walls
      Clock
      Message board
    Cupboards
      Boxes of cereal
    Island unit
      Fruit bowl
    Breakfast bar
      Chair
      Chair
  Lounge
    Lounge Walls
    TV stand
      Medium sized TV
      Large TV
      High end TV
    Couch
      Cushion
      cushion
    Luxury couch
      Plush cushion
      Plush cushion
      Throw
  Hall
    Hall walls
    Coat stand
    Table
      Plant
      Hall lamp
      Statue
    Painting
  Bedroom1
    Bedroom walls
    Standard bed
    High end bed
    Bedside table
      Bedside Lamp
    Bedside table
      Bedside Lamp
      Clock
    Standard mirror
    High end mirror Note that this structure contains information about any and all instances of 'high end apartment'—which is why in Bedroom1 there exists both a 'standard bed' and 'high end bed'. The relationship between those items is such that only one of them would be allowed to be active in a particular instance of a 'high end apartment', whereas bedside tables are defined which can go on either side of any of the beds and allow any combination of zero, one or both of the tables to be able to appear in a 'high end apartment'. Also, an item would only be permitted if its parent already existed—from the example, only one TV type would be allowed to appear, and it could appear only if the TV stand was also there.

In one embodiment, the graph structure is created by the designers of the interior. In particular, they establish what objects are permitted to be placed at various possible locations and the relationships between the objects. The correct population of objects is confirmed by beginning at the root of the graph and traversing out, accordingly each node corresponds to an object and the runtime code uses the values contained in the 'parameter block' to determine at each node if the object is to be created or not (and if created, what other properties it may be assigned). Each object associated with each node may have tags assigned to it which would allow the designer a broad level of control over the data they are editing—e.g., filtering all of the objects in a particular interior to show only 'high-end' options for an upmarket apartment.

In an alternative embodiment, the tagging may persist into the game itself such that the game performs the selection of parameters. The game would generate an interior based on a combination of the usual graph traversal method, a selection of tags to ensure a consistent theme to the interior, and a particular random number seed, which provides a random selection through the graph path.

The graph will provide the universe of possible rooms. In order to establish a particular interior, the designer or game script need only provide a block of parameters that stores a value to feed to each node in the ordered graph. These parameters select the path to re-create an interior. The parameters can range from being a simple on/off (e.g., to control an optional rug appearing or not), to any value (e.g., to control the number of tins appearing on a shelf, or the degree of dirtiness on a door). In addition, to the extent parameters are not specified for a particular node, a random path through the node. In this way, a large number of complex interiors can be created that are plausible because they follow the rules dictated by the graph using a relatively small set of data, e.g., the parameter block. The parameter block can store or transmit a complete description of these interiors. The parameter block structure can establish precisely which of the items in the description exist for a particular location, and it also provides any required additional data for items which need it.

In one embodiment, the parameter block is created at game development time in the stand-alone application used to create the interior graph structure: the game designer creates the graph to define all possible combinations (the graph) and also selects one particular set of nodes in the graph with some driving parameters to define a single interior in the world (the parameter block). The graph structure is thus tightly bound to the set of assets which have been determined as being appropriate for, or even specially constructed for that particular type of interior, and as such forms a large amount of data which cannot be easily altered without creating potential follow on errors. The parameter block, however, is much more amenable to editing because it can be ensured that it is completely valid for the current graph and is pure data without the underlying assets. Accordingly, the parameter block is safer to alter and amenable to machine generated parameter blocks.

Because the graph and parameter blocks are independent sets of data the designers are able to create multiple instances of one core interior into a world by duplicating and editing each parameter block to create unique instances of the room (within the constraint imposed by the graph definition). This is embodied by application code providing an interface suitable for editing the parameter block data.

In a further embodiment, an in-game interface for editing parameter blocks can be provided to allow the player of the game to edit a parameter block. This would allow the player to purchase and customize their own building in the game world. This customized world can be advantageously stored as a parameter block customized according to the player's selections. Advantageously, the parameter block can be verified suitable because it is validated by the graph structure.

One exemplary structure of a parameter block is a list of items (for example, in .xml) to identify specific graph nodes (by ID number) and optionally one or more property/value pairs. An exemplary model of such a simple parameter block is:

paramBlock: 47b_MainStreet
        item: HALL_TABLE (ID=0x5863a870)
            (property=material, value=oak)
            (property=wear, value=0.3)
        item: VASE (ID=0x84bd980)
            (property=material, value=glass)
            (property=colour, value=blue)
        item: BOWL (ID=0x39bf100)
            (property=material, value=stone)
            (property=colour, value=black)

The first exemplary entry above is a parameter block entry for the HALL_TABLE object (which would be a match for graph node ID 0x5863a870), and on creating the object at this node we would want to assign it an oak material and a wear value of 0.3 which would be assigned to the created object and used to modify how it looks & behaves accordingly. The Vase object and Bowl object would similarly reside on the table.

In a further example, each item has a unique ID associated with it, so the parameter block is based on a list of the IDs to pick out a selection from the description:

Apartment 53b, Main Street:
        Tiled kitchen floor
        Kitchen walls
        Message board
        Cupboards
        Boxes of cereal
        Lounge Walls
        TV stand
        Large TV
        Couch
        Cushion
        cushion
        Hall walls
        Table
        Hall lamp
        Bedroom walls
        Standard bed This data establishes exactly which parts of the top description of 'high end apartment' are to be used to construct the apartment at '53b Main Street.' Added to this data would be any extra parameters which can be used to potentially modify some of the items where desired:

Apartment 53b, Main Street:
　Tiled kitchen floor (colour=white)
　Kitchen walls (colour=blue)
　Message board (message='To Do')
　Cupboards
　Boxes of cereal (type='Cornflakes', number=3)
　Lounge Walls (colour=red)
　TV stand (material=oak)
　Large TV
　Couch (colour=purple)
　Cushion (colour=purple)
　Cushion (colour=orange)
　Hall walls (colour=magnolia)
　Table (material=pine)
　Lamp (colour=blue)
　Bedroom walls (colour=magnolia)
　Standard bed (material=pine)

This type of structure provides a wide range of usable variations of 'high end apartment' to place around the map, be able to describe each instance of that apartment in a concise manner and this allows us to change and store modifications to the apartments easily.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

The invention claimed is:

1. A system for executing a three-dimensional (3D) environment comprising:
　a rendering engine;
　a core system logic communicatively coupled to the rendering engine;
　an asset interface communicatively coupled to the core system logic and to a metadata asset store comprising a plurality of metadata records describing available assets, wherein each metadata record comprises an asset identifier, which identifies an asset, and a property tag that defines characteristics of the asset;
　one or more environment systems communicatively coupled to the asset interface;
　a script logic communicatively coupled to the asset interface;
　wherein the asset interface is configured to:
　　receive a request for insertion of an object into the 3D environment from the script logic or the environment systems and to use the received request to identify a metadata asset record based on the property tag of the metadata asset record, wherein the metadata asset record corresponds to a first asset of a first asset type;
　　identify, based on a match tag of the metadata asset record, a second asset of a second asset type, wherein the second asset of the second asset type is compatible with the first asset of the first asset type;
　　automatically formulate the object requested for insertion into the 3D environment, wherein an asset combination comprising the first asset of the first asset type and the second asset of the second asset type is identified;
　wherein the core system logic is configured to receive the automatically formulated object from the asset interface, and to instruct the rendering engine to load the automatically formulated object into the 3D environment; and
　wherein the first asset of a first asset type is an object, and the second asset of a second asset type is a texture.

2. The system of claim 1, wherein the core system logic is configured to receive the metadata asset record in order from the asset interface.

3. The system of claim 1, wherein the environment systems comprise one or more of an animal management system, a room generation system, a law system, and a population management system.

4. The system of claim 1, wherein the asset interface comprises a graph structure for defining relationships between assets.

5. The system of claim 4, wherein the request for insertion comprises a parameter block.

6. The system of claim 1, wherein the identification of the asset combination further comprises a randomization process.

7. The system of claim 1, wherein the match tag identifies a corresponding texture that can be used with the first asset of the first asset type.

8. The system of claim 1, wherein the metadata further comprises one or more of the following: match tags, randomization restrictions, expression data, optimization data, level of detail data, super level of detail data, a shader ID, and a category tag.

9. The system of claim 8, wherein the metadata comprises a randomization restriction that defines an action taken on the second asset of the second asset type.

10. The system of claim 8, wherein the metadata comprises expression data to define an animation.

11. The system of claim 8, wherein the metadata comprises optimization data.

12. The system of claim 8, wherein the metadata comprises level of detail data that defines a correspondence between a rendering distance and an asset resolution.

13. The system of claim 8, wherein the metadata comprises super level of detail data that defines a substitute asset to be employed at a given rendering distance.

14. The system of claim 8, wherein the metadata comprises a shader ID.

15. The system of claim 8, wherein the metadata comprises a category tag that is configured to be used to confirm that the object is valid.

16. The system of claim 1, wherein the core system logic is configured to read the asset metadata and modify gameplay according to the content of loaded assets.

17. A computer-implemented method for executing a three-dimensional (3D) environment comprising:
　receiving a request, at an asset interface communicatively coupled to a core system logic, one or more environment systems, and a metadata asset store comprising a plurality of metadata records describing available assets, wherein each metadata record comprises an asset identifier, which identifies an asset, and a property tag that defines characteristics of the asset, the request being transmitted from a script logic communicatively coupled to the asset interface or the environment systems for insertion of an object into the 3D environment;
　identifying a metadata asset record from the metadata asset store based on the received request and the property tag of the metadata asset record, wherein the metadata asset record corresponds to a first asset of a first asset type;
　identifying, based on a match tag of the metadata asset record, a second asset of a second asset type, wherein the second asset of the second asset type is compatible with the first asset of the first asset type;

automatically formulating the object requested for insertion into the 3D environment, wherein an asset combination comprising the first asset of the first asset type and the second asset of the second asset type is identified;

retrieving the automatically formulated object from the asset interface via the core system logic communicatively coupled to a rendering engine;

instructing the rendering engine, via the core system logic, to load the automatically formulated object into the 3D environment; and wherein the first asset of a first asset type is an object, and the second asset of a second asset type is a texture.

18. A non-transitory nonvolatile computer program product comprising a processor-readable medium having a sequence of instructions stored thereon, which, when executed by the processor, causes the processor to execute a three-dimensional (3D) environment, the sequence of instructions comprising:

instructions for receiving a request, at an asset interface communicatively coupled to a core system logic, one or more environment systems, and a metadata asset store comprising a plurality of metadata records describing available assets, wherein each metadata record comprises an asset identifier, which identifies an asset, and a property tag that defines characteristics of the asset, the request being transmitted from a script logic communicatively coupled to the asset interface or the environment systems for insertion of an object into the 3D environment;

instructions for identifying a metadata asset record from the metadata asset store based on the received request and the property tag of the metadata asset record, wherein the metadata asset record corresponds to a first asset of a first asset type;

instructions for identifying, based on a match tag of the metadata asset record, a second asset of a second asset type, wherein the second asset of the second asset type is compatible with the first asset of the first asset type;

instructions for automatically formulating the object requested for insertion into the 3D environment, wherein an asset combination comprising the first asset of the first asset type and the second asset of the second asset type is identified;

instructions for retrieving the automatically formulated object from the asset interface via the core system logic communicatively coupled to a rendering engine;

instructions for the rendering engine to load the automatically formulated object into the 3D environment; and wherein the first asset of a first asset type is an object, and the second asset of a second asset type is a texture.

* * * * *